L. P. BRADY.
RAKER FOR REAPING MACHINES.
No. 30,908. Patented Dec. 18, 1860.
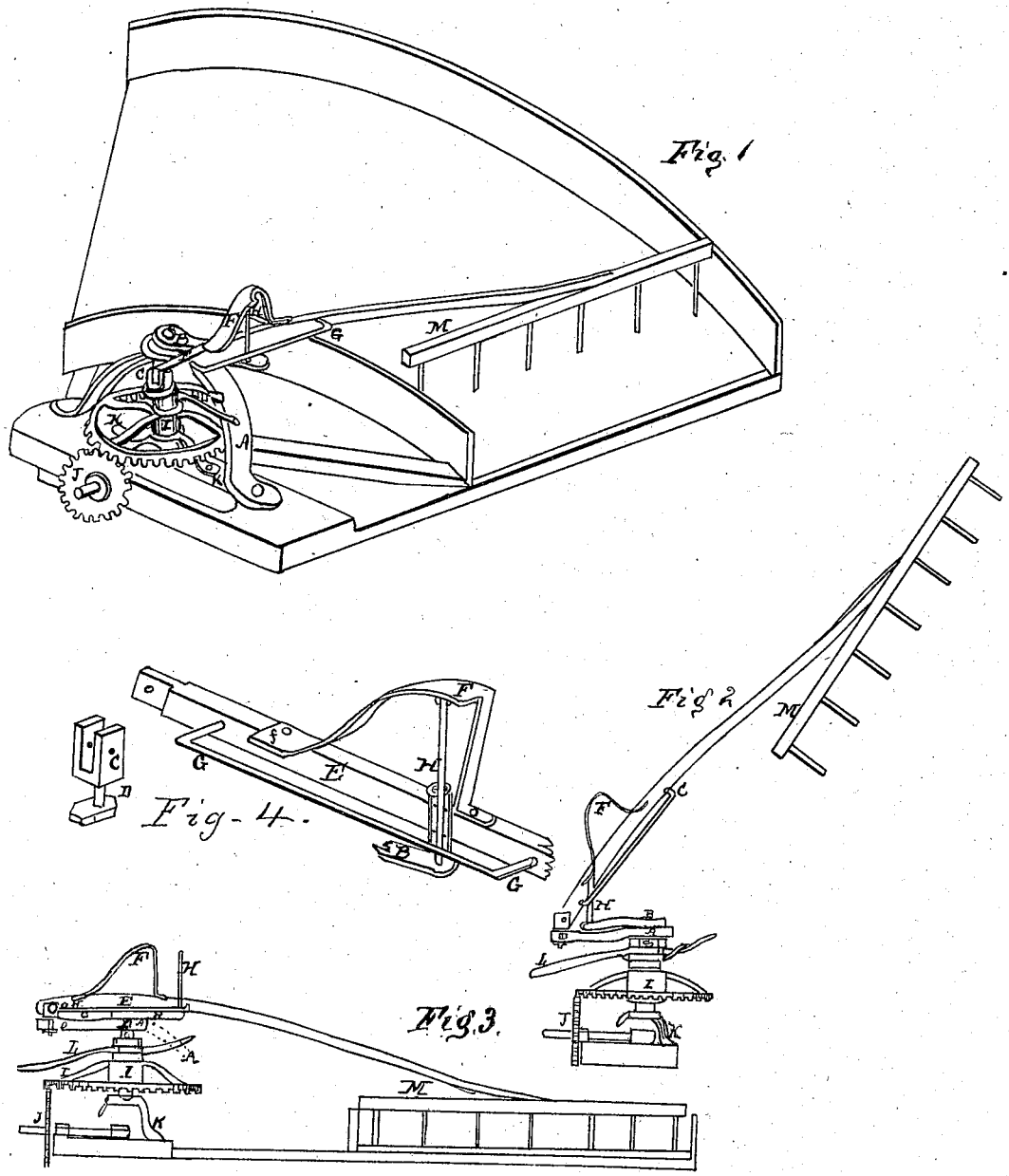

UNITED STATES PATENT OFFICE.

LEWIS P. BRADY, OF MOUNT JOY, PENNSYLVANIA.

IMPROVEMENT IN RAKES FOR HARVESTING-MACHINES.

Specification forming part of Letters Patent No. 30,908, dated December 18, 1860.

*To all whom it may concern:*

Be it known that I, LEWIS P. BRADY, of Mount Joy, in the county of Lancaster and State of Pennsylvania, have invented a new and useful device for operating the rake to be attached to reaping-machines; and I do hereby declare that the following is a full, clear, and exact description of the construction and operation of the same, reference being had to the accompanying drawings, making a part of this specification, in which—

Figure 1 is a perspective view of its application to the ordinary platform of reapers. Fig. 2 is a profile elevation of the rake raised, showing the relative position of the parts; Fig. 3, the same when the rake is down on the platform. Fig. 4 are enlarged views of my device in detail, separated in part.

The novelty of my device consists, mainly, in the construction of the rake-handle E. The end of the handle or rake-shaft E has a vertical motion on its pivot in the slotted swivel C, which swivel is supported by and turns in an arm, D, attached to the top of the arch-support or upper bearing, A, for a vertical shaft, around which is the cogged wheel I, shifting-lever L. This shaft rests on an arched step, K, and when in gear receives its motion from the pinion J. As shown, the pinion is connected to the axle of the machine on which it is employed—that is, the axle of the traction or driving wheel of the reaper. On the top of the revolving and vertical shaft there is a crank-arm, B, having a perpendicular pin, H, with or without friction-rollers around it and on its upper end. This pin H is confined in its motions in the long slot formed by the rod G, bent at right angles at each end, and said ends affixed to the side of the rake-handle E, as shown, Figs. 4 and 6. On the top of the rake-handle E is the overlapping bent band F, against the under side of which the upright shaft or pin H operates in raising the handle E.

The operation is as follows: The upright crank-pin H, being confined in the open slot formed by the rod G and rake-handle E in its movements back and forth in its revolution with the crank-arm B, is alternately brought under the plate F. Consequently when the rake is down on the platform, as shown by Fig. 3, the pin H, in coming forward and receding, presses against the side of the rake-handle and pushes it back over the platform, dislodging its contents, which, when fully cleared, brings the top of the pin H under the lifting-plate F, against which it now presses, and thereby raises the rake to the position shown by Fig. 2. When brought under the rear end of F at *f*, it then acts as a pivot on which the rake is turned forward and gradually let down behind the cutter-bar onto the platform, (shown by Fig. 3,) to repeat the operation by each revolution of the wheel I and crank-arm B on the upright shaft S.

This device is very simple and effectual, and operates the rake with the greatest facility and admiration, as fully tested.

I am aware that there is no novelty in the revolving shaft with its crank-arm, gearing, and shifting-lever; nor do I claim such as any part of my invention.

What I claim as my invention, and desire to secure by Letters Patent, is—

The overlapping plate F on the rake-handle E and the guide-rod G on its side, in combination with the slotted swivel C and perpendicular crank-pin H, when combined and arranged in the manner described, for the purpose specified.

LEWIS P. BRADY.

Witnesses:
S. G. MUSSER,
JACOB STAUFFER.